Jan. 14, 1947.  R. A. GOEPFRICH  2,414,409
BRAKE HOLDING MECHANISM
Filed June 9, 1941  4 Sheets—Sheet 1
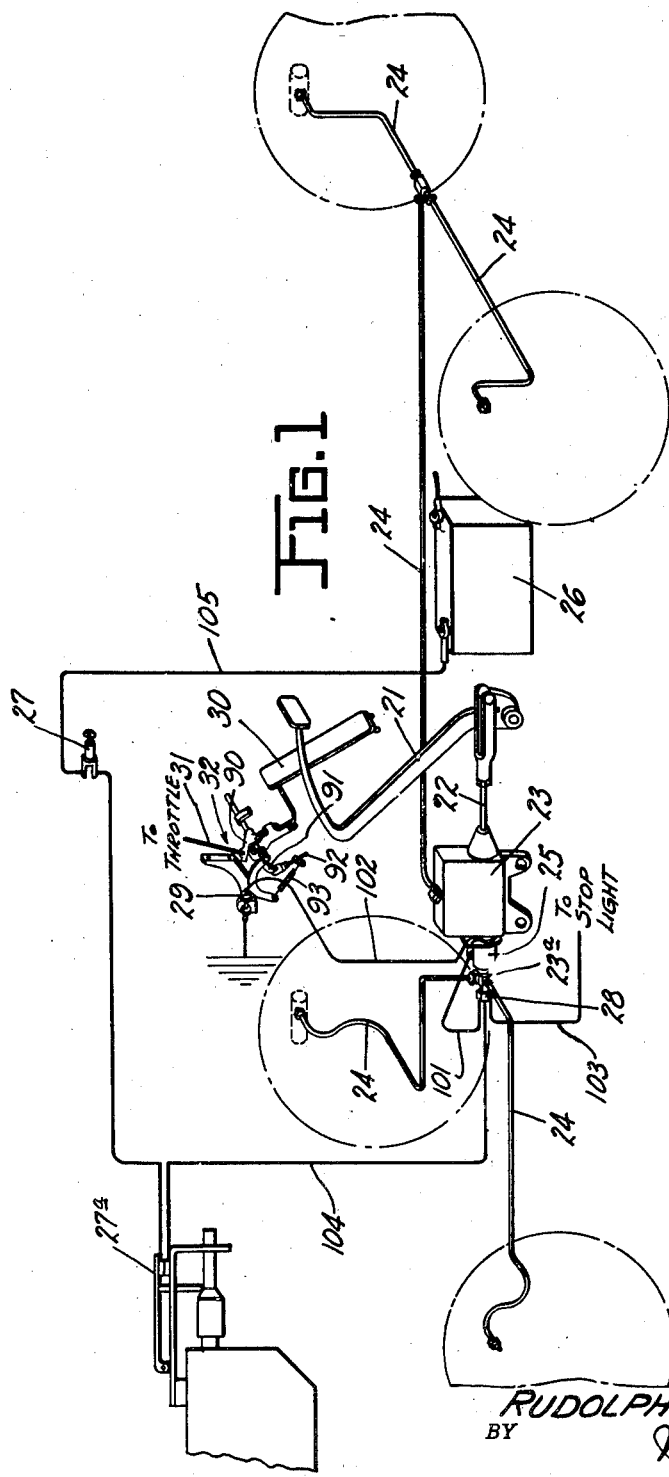
INVENTOR
RUDOLPH A. GOEPFRICH
BY
M. W. McConkey
ATTORNEY Jan. 14, 1947.                R. A. GOEPFRICH                2,414,409
                          BRAKE HOLDING MECHANISM
                          Filed June 9, 1941           4 Sheets-Sheet 2
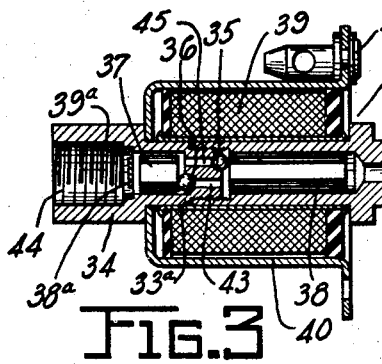
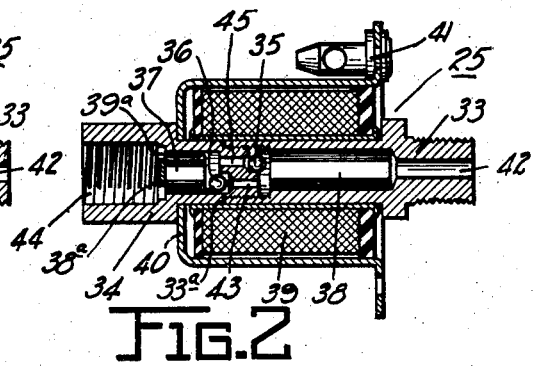
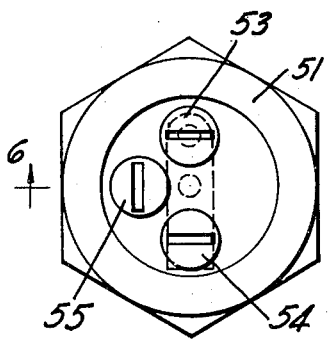
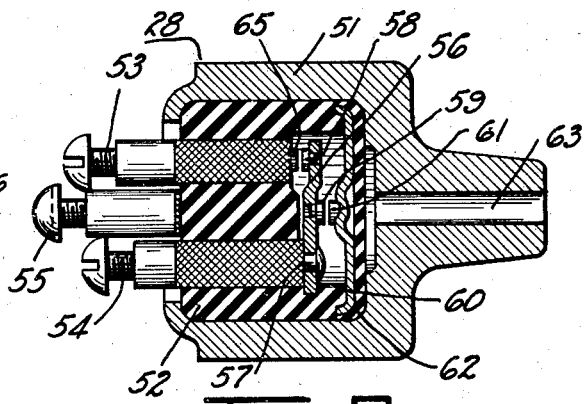
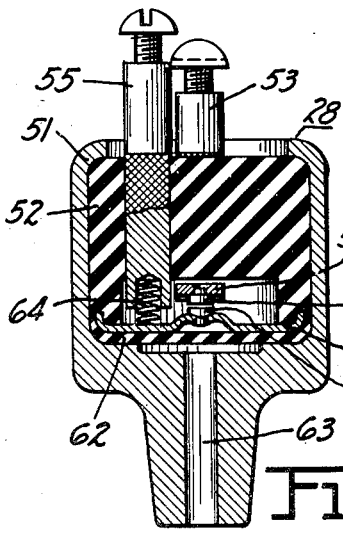
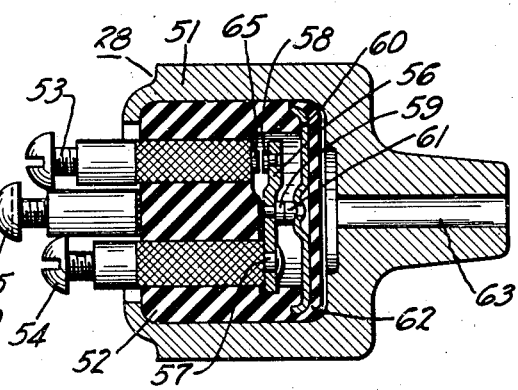
INVENTOR
RUDOLPH A. GOEPFRICH
BY
M. W. McConkey
ATTORNEY Jan. 14, 1947.  R. A. GOEPFRICH  2,414,409
BRAKE HOLDING MECHANISM
Filed June 9, 1941  4 Sheets-Sheet 3

INVENTOR
RUDOLPH A. GOEPFRICH
BY
M. W. McConkey
ATTORNEY

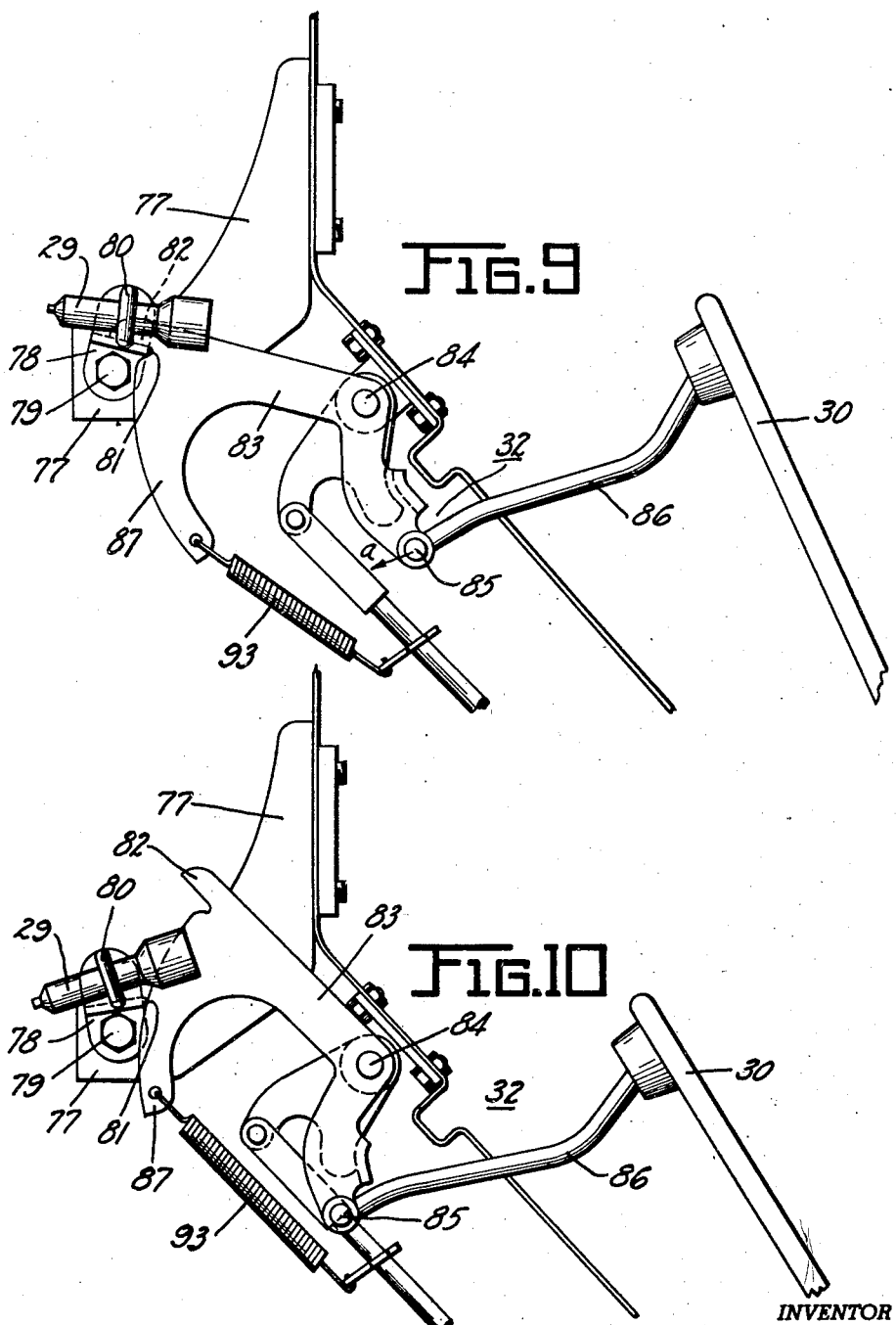

Patented Jan. 14, 1947

2,414,409

UNITED STATES PATENT OFFICE 2,414,409

BRAKE HOLDING MECHANISM

Rudolph A. Goepfrich, South Bend, Ind., assignor to Bendix Aviation Corporation, South Bend, Ind., a corporation of Delaware.

Application June 9, 1941, Serial No. 397,151

19 Claims. (Cl. 192—3)

This invention relates to brake holding devices and particularly to brake holding devices which are automatic in their operation and which make operation of vehicle controls easier by preventing brake release where such release might be inconvenient for the operator.

Broadly, my invention comprehends the use of an automatic brake holding device which is conjointly controlled by two control units one of which is responsive to the rate of deceleration of the vehicle and the other of which is responsive to the amount of brake applying pressure being exerted. The brake holding device is so arranged that the brakes will be held only when both of the control units are in a certain predetermined position. The arrangement of my invention is such that a brake applying pressure sufficient to bring the second control unit in position to allow the holding device to operate will create a vehicle deceleration sufficient to bring the first control unit to a position where it will prevent the brake holding means from operating until the vehicle has been brought to a stop. Thus there is no danger that the two control units will cause the brake holding device to hold the brake at any time when such holding would be dangerous or detrimental.

One of the objects of my invention is to provide a satisfactory anti-creep device, i. e., a device which will prevent a vehicle having a fluid transmission from moving forward after the vehicle has stopped but while the engine is idling. In the case of vehicles which utilize fluid flywheels for controlling the transmission ratios of the driving and driven parts, it has been found that even the slightest amount of fluid pressure created by the flywheel may cause some movement of the vehicle. It is therefore desirable to provide, as I have done in this invention, an anti-creep device which will prevent movement of the vehicle after it has been brought to a complete stop until the controls are manipulated by the operator to begin further movement.

It is a second object of my invention to provide a device which will function as a hill holder, i. e., a device which will hold the brakes in applied position if the vehicle is stopped on an incline and it is necessary for the driver to prevent movement of the vehicle under the influence of gravity and at the same time be prepared to initiate movement. It will be apparent that my device functions simultaneously as an anti-creep and as a hill holder, the hill holder functions resulting from the nature of the anti-creep.

Devices have been provided which will hold brakes applied once they have been actuated so long as a given vehicle control remains in a driver-actuated position, as for example the clutch control when the clutch is disengaged. A disadvantage of devices of this type is that the brakes are held only so long as the clutch is disengaged and the device therefore is not fully automatic. With brake holders which are actuated whenever any one of the vehicle controls is in a given position there is always the danger that the brakes will be held when holding them is neither desirable nor safe. This is true where a single clutch actuated device controls the brake holder, where a device is provided to hold the brakes whenever the accelerator is in released position, or where the condition of any single vehicle control member such as the transmission or transmission control determines the operation of the brake holder. In order to prevent the unwanted conditions which may occur with a single control for the brake holder, it has been proposed to include in series with the said single control a control which depends upon gravity for its actuation. The use of a gravity device has usually meant that the brake holder will be operable according to the position of the vehicle rather than the condition of deceleration or movement of the vehicle. Thus a gravity device may allow the brake holder to be actuated only when the vehicle is ascending a hill. In some cases a gravity device may be actuable if the deceleration of the vehicle is high. This is dangerous because it may cause the brakes to be locked when the application thereof is intended to be only temporary.

It is a further object, therefore, of my device to eliminate any defects which may have existed in earlier devices of this nature by providing a brake holder which will operate when the vehicle is stopped whether the vehicle is on the level or is ascending or descending an inclined plane.

It is also an object of my invention to provide a brake holder or locking means which will lock the brakes only when the vehicle has been brought to a stop and only when one of the vehicle controls is in a predetermined position.

Another object of my invention is to provide a novel brake holding valve device which will allow a decrease in brake holding pressure should that pressure become excessive.

It is a further object of my invention to provide a brake holding device which is controlled by an electric circuit, which is in turn controlled by a pair of switches in series, one of said switches being pressure actuated and the other being gravity actuated.

A still further object has been to provide a switch for control of a brake holder which responds to the position of one of the vehicle controls, to the positioning of the vehicle (whether facing upward, downward or on a level), and to the rate of acceleration or deceleration of the vehicle.

It is a further object of my invention to provide a pressure control switch which will make contact between certain contact members under a comparatively light pressure and which will make contact with another or other contact members under a comparatively heavy pressure.

Other desirable objects and advantages of my invention will be apparent during the course of the following description, in which reference is had to the accompanying drawings.

In the drawings,

Figure 1 is a schematic diagram showing the relative positions of the various parts of a braking system incorporating my invention;

Figure 2 is a section taken through the solenoid operated valve shown in Figure 1 and showing that valve in open position;

Figure 3 is a section through the valve of Figure 2 showing the said valve in closed position;

Figure 4 is a plan view of the pressure switch shown in Figure 1;

Figure 5 is a section taken through the pressure switch of Figure 4 showing the switch in open-circuit position;

Figure 6 is a section taken on the line 6—6 of Figure 4 and showing in detail certain features of the pressure switch;

Figure 7 is a section through the pressure switch corresponding to the section shown in Figure 5 but showing the switch with the stoplight circuit made;

Figure 9 shows the mercury switch of Figure 1 in the accelerator-released position;

Figure 10 shows the mercury switch of Figure 1 in the accelerator-on position;

Figure 8:
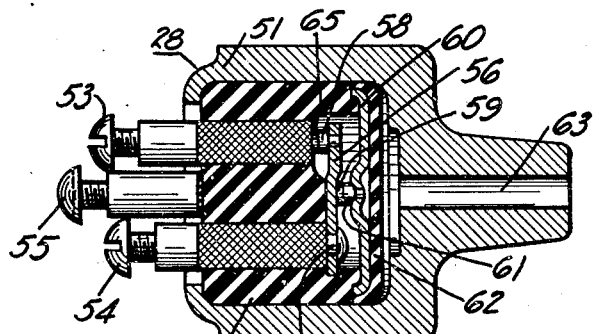
Figure 8 is a section taken through the pressure switch similar to the section of Figures 5 and 7, but showing the pressure switch with both the stoplight and solenoid circuits made.

In Figure 1 is shown a vehicle brake system which may be of the fluid or hydraulic type and which may comprise a brake pedal 21, a rod 22 movable in response to movement of the brake pedal, a master cylinder 23 having fluid therein which may be forced by a piston (not shown) from the master cylinder through an outlet fitting 23a and through a plurality of conduits 24 to actuate hydraulic motors (not shown) and apply brakes in a manner well known to those conversant with the art. The master cylinder 23 may be of any suitable or desired type. The operation of such a device is believed to be so well known that it will not be described with particularity here. Suffice it to say that movement toward the left of the rod 22 causes the ejection of fluid under pressure from the master cylinder. This pressure fluid before it may pass to the brake operating motors must pass through a valve device 25.

The valve device 25 is illustrated as solenoid-operated, although it will be apparent that many other types of valves might be substituted without departing from the scope of my invention. The solenoid-operated valve 25 is shown as controlled by an electrical circuit which may include in series a battery 26, a manually operable ignition switch 27, a gearshift or transmission switch 27a, a pressure switch 28, the solenoid valve 25, and a gravity switch 29. The ignition switch 27 may be included in the circuit to prevent operation of the brake holding device except when the ignition is turned on, and the gearshift or transmission switch 27a may be arranged to prevent operation of the automatic brake holding device when the vehicle is in reverse gear. The switch 29 is illustrated as a mercury switch but it will be obvious that other switches of a generally similar nature might be substituted. Another electrical circuit for control of a stoplight (not shown) may include the stoplight, the pressure switch 28, the ignition switch 27, and the battery 26. An accelerator pedal 30 is adapted to control a throttle (not shown) through a connection 31 and to simultaneously control the position of the gravity or mercury switch 29 through mechanism indicated generally at 32.

The valve 25 is illustrated in Figures 2 and 3. It may consist of a brass body 33 screwed onto a steel plug 34 with a gasket 33a therebetween. The valve may carry two ball check valves 35 and 36 which open in opposite directions. The steel plug may carry a comparatively short hexagonal steel plunger 37 while the brass body carries a comparatively long hexagonal steel plunger 38. A partial Welch plug 38a is pressed into the counterbore 39a to limit the movement of the short hexagonal steel plunger 37. A solenoid winding 39 surrounds the valve assembly. The solenoid winding is encased in a shell 40 which carries a pair of terminals 41 to which the ends of the solenoid winding are connected. One of the terminals 41 is connected to a wire 101 which leads to pressure switch 28 and the other terminal 41 is connected to a wire 102 which leads to the mercury or gravity switch 29. Therefore, the solenoid will be energized when the electric circuit which includes both pressure switch 28 and gravity switch 29 has been completed, but the solenoid will not be energized unless both switches are closed to make the circuit.

Operation of the solenoid valve is as follows: As shown in Figure 2, when the solenoid is not energized, if the brakes are applied, fluid from the master cylinder 33 enters a port 42, bypasses the hexagonal plunger 38, passes through a port or passage 43, moves past ball 36 and hexagonal plunger 37 and out through a port 44 to the wheel cylinders. The velocity of the fluid may cause ball check valve 35 to seat during the brake application.

When the brakes are released, fluid from the wheel cylinders returns through port 44, past hexagonal plunger 37, through a port or passage 45, past ball 35 and hexagonal plunger 38 and out through port 42 to the master cylinder. The velocity of the returning fluid may seat ball check 36 during brake release.

When the solenoid is energized as shown in Figure 3, the magnetic forces set up by the solenoid cause plungers 38 and 37 to approach each other, thus moving both ball check valves 35 and 36 to close the passages 43 and 45. The comparatively massive plunger 38 will hold the ball 35 seated with considerably more force than the small plunger 37 will exert on the ball 36. This is true first because the force exerted by the magnet on its armature portions 38 or 37 will be proportional to the mass of the said armature portions and second because force exerted by the magnetic coil depends upon the closeness of the armature portions to the center of the coil and, as will be apparent from the figures, plunger or armature 38 extends well into the center of the solenoid while plunger or armature 37 is at one end of the solenoid. For example, the ball 35 may hold in the line a pressure of approximately 500 pounds per square inch, while the ball 36 may hold a pressure of only about 20 pounds per square inch. The action of the plunger 37 on the ball 36 is similar to that of a very light spring working on the ball.

It will be noted that this maximum pressure of 500 pounds per square inch is controlled by the force which the solenoid imparts to the plunger 38. This is a safety feature. For example, if the brakes have been used to the extent where the drums are quite hot, and the solenoid energized to lock the pressure in the lines, the contraction of the drums in cooling would tend to increase the pressure locked in the line. This pressure could, under certain conditions, attain a value of 2000 pounds per square inch. However, when this pressure exceeds 500 pounds per square inch, its force on the ball 35 is transmitted to the plunger 38, which force is sufficient to overcome the influence of the solenoid force on the plunger 38, thereby opening ball check 35 until the pressure in the line drops to 500 pounds per square inch, when the ball will again seat. The pressure which can be locked in the line may thus be limited to 500 pounds per square inch or any desired amount. This pressure can be varied by changing the solenoid windings, or by changing the physical dimensions of the ball seat or the plunger.

Figures 4 to 8, inclusive, show the pressure switch 28. It may consist of a body portion 51, an insulating portion 52, a plurality of terminals 53, 54, and 55 imbedded in the insulating portion, a contact member 56 connected to the terminal 54 at 57 and having a plurality of projections 58 and 59, a metal plate or diaphragm 60 having a projection 61 and resting at its periphery against the insulating portion 52, and a flexible or pressure responsive diaphragm 62 of rubber or like material. The metal diaphragm 60 is insulated from the casing by the flexible diaphragm 62 and the insulating portion 52. A passage 63 is provided through one end of the body portion 51 to admit fluid from the brake system into the interior of the switch so that the said fluid may exert a pressure on the diaphragm 62 tending to move the center portion of the plate 60 inwardly and tending to move the contact member 56 once the projections 61 and 59 have come into contact with each other. Terminal 53 is connected by the wire 101 to one terminal of the solenoid 25. Terminal 54 is connected by the wire 103 to a stoplight (not shown). Terminal 55 is connected by the wire 104 to an ignition switch 27 which in turn is connected by the wire 105 to the battery 26. An electric current conducting spring 64 keeps the battery terminal 55 at all times in electrical contact with the metal plate 66 which is also a conductor of electricity. A contact projection 65 is provided on the inner end of terminal 53. The projection 65 is adapted to cooperate at times with the projection 58 to establish electrical contact between terminal 53 and contact member 56. Likewise, the projections 59 and 61 are adapted to cooperate at times to establish electrical contact between the contact member 56 and the metal plate 60.

Operation of the pressure switch is as follows: When fluid in the master cylinder 23 is put under pressure to apply the brakes, fluid under pressure is forced from the conduits connecting the master cylinder to the wheel cylinders into pressure switch 28 through passage 63. When the fluid pressure in the brake lines reaches a value of, say, 45 or 50 pounds per square inch, the diaphragm 62 pushes on the metal plate 60 to establish contact between projections 59 and 61. This establishes electrical contact between the battery terminal 55 and the stoplight terminal 54 so that the stoplight circuit will be closed provided there are no other open switches in it. This position of the pressure switch is shown in Figure 7, where the stoplight circuit is closed at the pressure switch but the solenoid circuit is held open at the pressure switch.

Further pressure against the diaphragm 62 moves the end of contact member 56 about 57 as a pivot tending to move projection 58 toward projection 65. When the brake line pressure has reached, say, 175 or 200 pounds per square inch, contact is established between projections 58 and 65 serving to electrically connect solenoid terminal 53 to battery terminal 55 and thus to close the solenoid circuit at least insofar as the pressure switch 28 is concerned. If the solenoid circuit is made through the mercury or gravity switch 29 and also through the switch 27, electricity will be enabled to flow through the solenoid coil, and thereby energize the solenoid.

Figures 9 and 10 show the mercury switch 29 and the mechanism 32 for controlling the position of the mercury switch in accordance with the position of the accelerator pedal 30. In Figure 9, the mercury switch is shown in the position it has when the accelerator is released and in Figure 10 the mercury switch is shown in the position it has when the accelerator is actuated.

Figure 12:
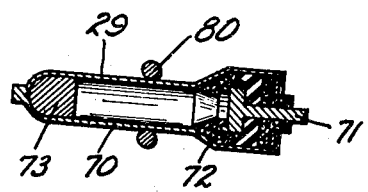
Figure 12 shows the position of the mercury globule in the mercury switch when the accelerator is released and the vehicle is decelerating at a rapid rate.
Figure 13:
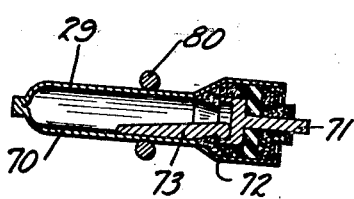
Figure 13 shows the position of the mercury globule in the mercury switch when the accelerator is released and the vehicle is coasting or standing still.
Figure 14:
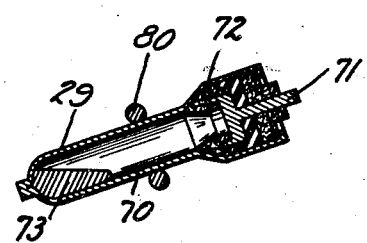
Figure 14 shows the position of the mercury globule in the mercury switch when the accelerator pedal is depressed and the accelerator is actuated.

As shown in Figures 12, 13 and 14, the mercury or gravity switch 29 comprises a grounded shell or casing 70, a terminal 71 and an insulating shell 72 of ceramic or other suitable material which is positioned between the terminal and the shell to prevent electrical contact therebetween. A mercury globule 73 acts as the contact member of the switch. When the mercury switch is in the position shown in Figure 13, the globule 73 bridges the ceramic shell 72 to connect the grounded shell 70 to the terminal 71 and make the circuit through the mercury switch.

Figure 11:
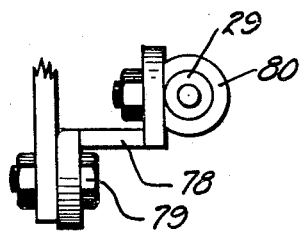
Figure 11 is a side view of the bracket for supporting the mercury switch.

As shown in Figures 9 and 10, the mercury switch 29 is pivotally mounted to a bracket 77 by means of a Z shaped bracket 78 (see Figure 11) and pivot pin 79. The mercury switch is adjustably mounted on the Z bracket 78 by means of an eye 80. A projecting nib 81 on the Z bracket 78, and a finger 82 on a lever 83 accurately locate the released position (Figure 9) of the mercury switch. The lever 83 is a bellcrank pivoted to a stationary part of the vehicle by a shaft 84 and connected at 85 to a link 86 which is actuated by the accelerator pedal. Downward movement of the accelerator pedal 30 acts on lever 83 to rotate it on shaft 84 in a direction shown by the arrow $a$. The lever 83 (see Figure 1) picks up a bellcrank lever 90 to operate the throttle through the rod 31. The lever 83 also picks up a lever 91 to operate the control for an automatic transmission by means of a rod 92. A spring 93 is adapted to return the whole assembly to released position.

When the accelerator is depressed as shown in Figure 10, upward movement of the end of lever 83 kicks the nib 81 of Z lever 78 out of its socket in the lever 83 and tilts the Z lever and the mercury switch about the pivot pin or fulcrum 79 to the position shown in Figures 10 and 14. As can be seen from Figure 14, this moves the mercury globule to the end of the shell 70 and breaks the circuit, since the mercury no longer bridges the ceramic shell 72. The projecting end 87 of the lever 83 is so shaped that the mercury switch remains at the angle shown in Figures 10 and 14 throughout the accelerator pedal stroke. A spring (not shown) keeps the nib 81 in contact with the arcuate surface 87 of lever 83.

In conventional driving, with the accelerator depressed, the mercury switch 29 is in the position shown in Figures 10 and 14, and the circuit through the mercury switch is broken. If now the accelerator is released, the mercury switch will take the position shown in Figures 9 and 13, and the circuit will be made through the mercury switch. However, the circuit is still broken at the pressure switch 28 as shown in Figure 5. If now the brakes are applied the pressure in the pressure switch "makes" the stoplight circuit as in Figure 7. If additional pressure is applied to the brake pedal, that is, pressure sufficient to give a line pressure of over, say, 175 pounds per square inch, the solenoid circuit is "made" through the pressure switch as shown in Figue 8. This assumed pressure will cause a deceleration of more than four feet per second per second. If the complete circuit were now made, the brakes would remain locked. However, the complete circuit is not made. Before the pressure switch was closed, that is, at a pressure lower than 175 pounds per square inch and at a deceleration of about four feet per second per second, its momentum caused the mercury globule in the mercury switch to move forward and break the circuit as shown in Figure 12. If now the brakes are held applied till the car comes to a stop, the mercury globule will roll back as shown in Figure 13, the circuit will be made and the solenoid valve will operate to hold the brake pressure in the lines and consequently hold the brakes applied notwithstanding the foot is removed from the brake pedal.

In restarting, the accelerator is depressed, the circuit is broken at the mercury switch as shown in Figures 10 and 14 and the solenoid is deenergized, thus allowing the valve to open to release the brakes.

For decelerations of less than four feet per second per second the brakes do not lock because although the circuit may be "made" at the mercury switch, it is "not made" at the pressure switch. Thus this device is operative only when the car is substantially motionless.

It will be understood that figures used in describing my invention are merely illustrative and may be varied at will without departing from the scope of the invention.

It is apparent from the preceding description that my device will operate as a hill holder for all conditions of ascending a hill forwardly.

This device is operative at all times in reverse provided sufficient pressure, that is, more than 175 pounds per square inch is created in the lines. If this is objectionable, a switch may be installed on the gear shift lever in series in the above circuit such that when the gear shift lever is in the reverse position the circuit is broken and the device is inoperative.

The following chart shows the conditions of operation for various conditions of car operation:

| Condition of car operation | Pressure switch | Mercury switch | Circuit | Solenoid | Anti-creep |
|---|---|---|---|---|---|
| Normal driving—accelerator depressed | Off | Off | Broken | Off | Inoperative. |
| Coasting—accelerator released | do | On | do | do | Do. |
| Decel.—more than 4 ft./sec./sec | On | Off | do | do | Do. |
| Decel.—less than 4 ft./sec./sec | Off | On | do | do | Do. |
| Standing on level after brakes applied | On | do | Made | On | Operative. |
| Facing up hill after brakes applied | do | do | do | do | Do. |
| Facing down hill after brakes applied | do | Depends on angle of slope. | Broken | Off | Inoperative. |

Although certain specific embodiments of my invention have been used for illustrative purposes, it is obvious that my invention may be put to numerous uses besides those specifically shown and described. It is therefore my intention not to limit the scope of my invention except by the terms of the appended claims.

I claim:

1. For use in a vehicle having a fluid braking system and a control member, an actuating cylinder for the fluid braking system, a motor cylinder for the fluid braking system normally connected to the said actuating cylinder, a valve member interposed between the actuating cylinder and the motor cylinder which normally allows free communication between the actuating cylinder and the motor cylinder, means associated with the valve member for cutting off communication between the actuating cylinder and the motor cylinder, and means for actuating the said cutting off means comprising an electrical circuit having a switch controlled by the fluid pressure prevailing in the motor cylinder and having a switch controlled by the position of the aforesaid vehicle control and by the rate of deceleration of the vehicle.

2. For use in a vehicle having a fluid braking system and a control member, an actuating cylinder for the fluid braking system, a motor cylinder for the fluid braking system normally connected to the said actuating cylinder, means for cutting off communication between the actuating cylinder and the motor cylinder, and means for actuating the last-named means comprising an electrical circuit having a switch controlled by the fluid pressure prevailing in the motor cylinder and having a switch controlled by the position of the aforesaid vehicle control and by the rate of deceleration of the vehicle.

3. A brake holding device comprising a solenoid-controlled valve for at times preventing brake release, and an electrical circuit for energizing the said solenoid valve including in series a pressure switch which closes when the brake applying pressure exceeds a predetermined amount, and a gravity switch which opens under the stopping effect of the brakes before the pressure switch closes.

4. An automatic brake holding device for fluid pressure brakes comprising a valve, electrical means for closing the valve, a circuit for energizing the electrical means to close the valve, a switch for in part controlling the circuit which closes when the fluid pressure in the brakes reaches a certain predetermined amount, and a switch for in part controlling the circuit which closes under the influence of gravity and which is adapted to be positioned by operator operated means.

5. For use in a vehicle having a control member, a brake holding device for fluid pressure brakes comprising a valve, electrical means for closing the valve, a circuit for energizing the electrical means to close the valve, a switch for in part controlling the circuit which closes when the fluid pressure in the brakes reaches a certain predetermined amount, and a switch for in part controlling the circuit which closes only when the control member has reached an inoperative position and deceleration of the vehicle is less than a certain predetermined amount.

6. For use in a vehicle having a control member, a brake holding device for fluid pressure brakes comprising a valve, electrical means for controlling the valve, a circuit for energizing the electrical means, a switch for in part controlling the circuit which closes only when the fluid pressure in the brakes reaches a certain predetermined amount, and a switch for in part controlling the circuit which closes under the influence of gravity only when the control member has reached a given position and deceleration of the vehicle is less than a certain predetermined amount.

7. For controlling the operation of a vehicle brake automatic holding device, the combination of a control adapted to be urged by gravity to a position wherein it allows operation of the brake holding device when the vehicle is on level ground, with a second control which prevents operation of the holding device until the moving vehicle has attained a rate of deceleration sufficient to cause inertia of the first control and its consequent high velocity relative to the vehicle to prevent operation of the brake holding device.

8. For controlling an automatic brake holding device adapted to be used on an automotive vehicle, the combination of a control comprising a gravity actuated element which so long as the control maintains a certain position is adapted to allow operation of the brake holding device whether the vehicle is on the level or facing either up any incline or down a limited incline and which is capable of moving under the influence of its own inertia to a position wherein it prevents operation of the brake holding device, with a second control which is so arranged as to prevent operation of the holding device until the moving vehicle has attained a rate of deceleration sufficient to cause inertia of the aforesaid element to move it to a position wherein it prevents operation of the brake holding device.

9. For controlling an automatic brake holding device adapted to be used on an automotive vehicle, the combination of a control comprising a gravity actuated element which so long as the control maintains a certain inclined position is adapted to allow operation of the brake holding device and which due to its own inertia will prevent operation of the brake holding device when and only when the rate of deceleration of the moving vehicle exceeds a certain predetermined amount, with a second control which prevents operation of the holding device until the moving vehicle has attained a rate of deceleration which exceeds the predetermined amount necessary to cause the first control to itself prevent operation of the brake holding device.

10. For controlling an automatic brake holding device adapted to be used in conjunction with the fluid pressure braking system of an automotive vehicle, the combination of a control comprising a gravity actuated element which so long as the control maintains a predetermined inclined position is adapted to allow operation of the brake holding device and which has a limited freedom of movement so that its own inertia will prevent operation of the brake holding device when and only when the rate of deceleration of the moving vehicle exceeds a certain predetermined amount, with a second control which is operated by the fluid pressure prevailing in the braking system of the vehicle and which is adjusted to prevent operation of the holding device until a fluid pressure has been reached sufficient to cause the moving vehicle to attain a rate of deceleration which exceeds the predetermined amount necessary to cause the first control to itself prevent operation of the brake holding device.

11. For use in a vehicle having a fluid braking system and a control member, an actuating cylinder for the fluid braking system, a motor cylinder for the fluid braking system normally connected to the actuating cylinder, means for cutting off communication between the actuating cylinder and the motor cylinder, and means for actuating the last named means comprising an element controlled by the fluid pressure prevailing in the motor cylinder and an element controlled by the position of the aforesaid vehicle control and by the rate of deceleration of the vehicle.

12. For use in a vehicle having a fluid braking system and a control member, an actuating cylinder for the fluid braking system, a motor cylinder for the fluid braking system normally connected to the actuating cylinder, means for cutting off communication between the actuating cylinder and the motor cylinder, and means for actuating the last named means comprising in series an element operated only when the pressure in the fluid braking system exceeds a certain predetermined amount and an element operated only when the aforesaid vehicle control is in a given position and the rate of deceleration of the vehicle is greater than a certain predetermined amount.

13. A brake holding device comprising a valve for at times preventing brake release, and an electrical circuit for actuating said valve including, in series, a pressure switch which closes when the brake applying pressure exceeds a predetermined amount, and a gravity switch which is normally closed, but which opens under the stopping effect of the brakes before the pressure switch closes.

14. For use in a vehicle having an accelerator control, a brake holding device for fluid pressure brakes comprising a valve, electric means for closing the valve, a circuit for energizing the electric means to close the valve, a switch for in part controlling the circuit which closes when the fluid pressure in the brakes reaches a certain predetermined amount, and a switch for in part controlling the circuit which closes when the accelerator control has reached released position and deceleration of the vehicle is less than a certain predetermined amount.

15. For a fluid pressure braking system, an anti-creep for preventing unwanted movement of the vehicle comprising automatically controlled means for maintaining brake holding pressure at the brakes after the vehicle has been brought to a stop, an electric circuit for controlling said means, a switch in the circuit having a casing inclined with respect to the vehicle, said switch being made by a mercury globule biased toward its contact making position and toward the rear of the vehicle by the inclination of the casing but free to overcome such bias under the influence of its own inertia, and a switch in the circuit actuated according to the pressure prevailing in the fluid pressure braking system, the last-named switch being arranged to close only when the pressure prevailing in the braking system is sufficient to obtain a deceleration capable of throwing the mercury globule away from contact making position.

16. For a fluid pressure braking system, an anti-creep for preventing unwanted movement of the vehicle comprising automatically controlled means for maintaining brake holding pressure at the brakes after the vehicle has been brought to a stop, an electric circuit for controlling said means, a switch in the circuit having a casing inclined with respect to the vehicle, said switch being made by an element biased toward its contact making position and toward the rear of the vehicle by the inclination of the casing but free to overcome such bias under the influence of its own inertia, and a switch in the circuit actuated according to the pressure prevailing in the fluid pressure braking system, the last-named switch being arranged to close only when the pressure prevailing in the braking system is sufficient to obtain a deceleration capable of throwing the element of the first-mentioned switch away from its contact making position.

17. For a fluid pressure braking system, an anti-creep for preventing unwanted movement of the vehicle comprising automatically controlled means for maintaining brake holding pressure at the brakes after the vehicle has been brought to a stop, an electric circuit for controlling said means, a switch in the circuit having a casing inclined with respect to the vehicle, said switch being made by an element biased toward its contact making position and toward the rear of the vehicle by the inclination of the casing but free to overcome such bias under the influence of its own inertia, a switch in the circuit actuated according to the pressure prevailing in the fluid pressure braking system, and means adapted to be operated by one of the vehicle controls for changing the angle of inclination of the casing of the first switch.

18. For use in a fluid pressure braking system for an automotive vehicle, automatically operable means for at times holding the brakes applied without attention from the operator including a pressure actuated control arranged to prevent holding of the brakes until the fluid pressure prevailing in the brake system is greater than a predetermined amount, and an inertia actuated control arranged to prevent holding of the brakes whenever the rate of deceleration of the vehicle is more than a predetermined amount, the latter control being normally biased by gravity to a position permitting holding of the brakes so long as the vehicle is facing uphill, on the level, or facing downhill at a limited angle.

19. For controlling an automatic brake holding device adapted to be used in conjunction with the fluid pressure braking system of an automotive vehicle, the combination of a control comprising a gravity actuated element which so long as the control maintains a predetermined inclined position is adapted to allow operation of the brake holding device and which has a limited freedom of movement so that its own inertia will prevent operation of the brake holding device when and only when the rate of deceleration of the forward moving vehicle exceeds a certain predetermined amount, with a second control which is operated by the fluid pressure prevailing in the braking system of the vehicle and which is adjusted to prevent operation of the holding device until a fluid pressure has been reached sufficient to cause the moving vehicle to attain a rate of deceleration which exceeds the predetermined amount necessary to cause the first control to itself prevent operation of the brake holding device, and a third control which prevents operation of the holding device when the vehicle is in reverse gear.

RUDOLPH A. GOEPFRICH.